United States Patent
Satake et al.

(10) Patent No.: US 6,316,138 B1
(45) Date of Patent: *Nov. 13, 2001

(54) SOLID OXIDE ELECTROLYTE FUEL CELL

(75) Inventors: Tokuki Satake; Kiyoshi Watanabe; Fusayuki Nanjo; Koichi Takenobu, all of Kobe; Hitoshi Miyamoto, Takasago, all of (JP)

(73) Assignee: Mitsubishi, Jukogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/273,455

(22) Filed: Jul. 11, 1994

(51) Int. Cl.$^7$ ...................................................... H01M 8/10
(52) U.S. Cl. ................................ 429/36; 429/30; 429/32; 429/34
(58) Field of Search ................................ 429/30, 32, 34, 429/36

(56) References Cited

U.S. PATENT DOCUMENTS

| | | | |
|---|---|---|---|
| 4,476,198 | * 10/1984 | Ackerman et al. | 429/32 |
| 4,499,663 | * 2/1985 | Zwick et al. | 29/623.1 |
| 4,857,420 | 8/1989 | Maricle et al. | 429/30 |
| 5,035,961 | * 7/1991 | Riley | 429/30 |
| 5,169,731 | * 12/1992 | Yoshimura et al. | 29/30 |
| 5,173,372 | * 12/1992 | Matsuo et al. | 429/33 |
| 5,213,910 | * 5/1993 | Yamada | 429/32 |
| 5,227,256 | * 7/1993 | Marianowski et al. | 429/16 |

FOREIGN PATENT DOCUMENTS

| | | |
|---|---|---|
| 2-204974 | 8/1990 | (JP) . |
| 2-276166 | 11/1990 | (JP) . |
| 3-116659 | 5/1991 | (JP) . |
| 4-8259 | 1/1992 | (JP) . |
| 4-56075 | 2/1992 | (JP) . |

* cited by examiner

Primary Examiner—Carol Chaney
(74) Attorney, Agent, or Firm—Wenderoth, Lind & Ponack L.L.P.

(57) ABSTRACT

An improved structure of a solid oxide electrolyte fuel cell (SOFC) is disclosed. A generating layer in the SOFC consists of three layers of a fuel electrode, an oxide layer and an oxygen electrode, and is shaped into a dimpled structure having recessed portions on its both surfaces. Protruded portions on the side of the fuel electrode are electrically bonded with an interconnector layer via a first conductive adhesive, while protruded portions on the side of the oxygen electrode of another generating layer are electrically bonded with the same interconnector layer via a second conductive adhesive. A plurality of generating layers and a plurality of interconnector layers are alternately stacked and they are electrically bonded in the above-described manner. Preferably the first conductive adhesive is made of material common to the fuel electrode and the second conductive adhesive is made of material common to the oxygen electrode. Owing to the improved structure, occurrence of lateral flows of electrons in the interconnector layers having a large resistance can be suppressed, hence an electrical resistance can be reduced, and also amounts of materials of the oxygen electrode and the fuel electrode can be made small.

2 Claims, 2 Drawing Sheets

SOLID OXIDE ELECTROLYTE FUEL CELL

BACKGROUND OF THE INVENTION

1. Field of the Invention

The present invention relates to a solid oxide electrolyte fuel cell (SOFC), and more particularly to an SOFC available, besides for power generating purpose, as an electrolyte cell of hydro-electrolysis, CO-electrolysis or the like.

2. Description of the Prior Art

As an SOFC in the prior art, a construction proposed by the applicant of this application and disclosed in Laid-Open Japanese Utility Model Specification No. 4-8259 (1992), has been known. FIG. 3 in the accompanying drawings of the present application is equivalent to FIG. 1 in this laid-open U.M. specification, which shows an outline of the proposed construction.

In FIG. 3, reference numeral 1 designates a generating layer composed of a solid oxide layer 2 and a fuel electrode 3 and an oxygen electrode 4 respectively disposed on the opposite sides of the solid oxide layer 2. Above and under the generating layer 1 are disposed laminated layers 8a and 8b each consisting of an interconnector layer 5 and an oxygen electrode 6 and a fuel electrode 7 respectively laminated on the opposite sides of the interconnector layer 5. An outside crest portion 9 of the fuel electrode 3 on the upper side of the generating layer 1 is bonded with the fuel electrode 7 of the upper laminated layer 8a, and a fuel passage 10 is formed of a space reserved therebetween. On the other hand, an outside crest portion 11 of the oxygen electrode 4 on the under side of the generating layer 1 is bonded with the oxygen electrode 6 of the lower laminated layer 8b, and an oxidizer passage 12 is formed of a space reserved therebetween.

As explained in the above-referred laid-open Japanese U.M. specification, in contrast to the structure so far considered a main current, the above-described structure is a really important proposal in this technical field in that members not directly concerned in power generation such as support members interposed between the generating layer 1 and the laminated layers 8a and 8b are made unnecessary.

It is to be noted that while an SOFC has a power generation efficiency exceeding 60% and is ranked at an important level in view of measures for energy control, a countermeasure such as reduction of a manufacturing cost is necessitated. Although the SOFC structure in the prior art shown in FIG. 3 achieved an important improvement in this respect, it still involved a problem that the oxygen electrodes 6 and the fuel electrodes 7 forming the laminated layers 8a and 8b, which are not directly concerned in power generation per se, were necessary.

In the above-described construction, since the generating layer 1 employed a dimpled structure, electrons produced in the generating layer 1 would concentrate to a dimpled portion (recessed portion), and hence, if the dimpled portion is in itself directly bonded with the interconnector layer, an electric resistance becomes large. The reason for the necessity of the oxygen electrodes 6 and the fuel electrodes 7 forming the laminated layers 8a and 8b is because it was intended to bring the dimpled portions into contact with the corresponding electrode 6 or 7 so that the produced electrons can diffuse and a lateral flow of electrons can be generated.

SUMMARY OF THE INVENTION

It is therefore one object of the present invention to provide an improved solid oxide fuel cell (SOFC) which preserves the merit of the above-described SOFC in the prior art and yet has its electric resistance minimized, and also whose manufacturing cost is reduced by decreasing component members.

According to a principal feature of the present invention, in order to achieve the above-mentioned object in a solid oxide fuel cell comprising a generating layer formed by disposing a fuel electrode and an oxygen electrode on the opposite sides of a solid oxide layer shaped in a dimpled structure, the following construction is employed for the above-mentioned generating layer.

A generating layer consisting of three layers of a fuel electrode, a solid oxide layer and an oxygen electrode is shaped in a dimpled structure having recessed portions formed on its respective surfaces, protruded portions on the side of the fuel electrode outside of the above-mentioned recessed portions are electrically bonded with an interconnector layer via a first conductive adhesive, and protruded portions on the side of the oxygen electrode outside of recessed portions of another generating layer are electrically bonded with the same interconnector layer via a second conductive adhesive as opposed to the first-mentioned protruded portions.

Generally, in an SOFC, since yttria-stabilized-zirconia (hereinafter abbreviated as YSZ) formed as ceramics is employed for the solid oxide layer, contrivance is made so as to prevent cracking of the solid oxide layer caused by thermal deformation of the generating layer composed of cell component members having different coefficients of thermal expansion and constrained by one another by equalizing the coefficients of thermal expansion of the respective cell component members.

Therefore, in the SOFC according to the present invention also, it is required to use fuel electrode material, oxygen electrode material and interconnector material having coefficients of thermal expansion matched to that of the solid oxide layer, and materials having negligibly small specific electric resistances are employed. As representative examples of the materials, the following materials are available on the basis of results of experiments conducted by the inventors of the present invention:

interconnector material: $LaSrCrO_3$ (1 mm in thickness)
   fuel passage side:
      conductivity 1 S/cm, resistance 0.1 $\Omega \cdot cm^2$
   oxidizer passage side:
      conductivity 30 S/cm, resistance 0.003 $\Omega \cdot cm^2$
   average:
      conductivity 10 S/cm, resistance 0.01 $\Omega \cdot cm^2$
oxygen electrode material: $LaSrMnO_3$ (50 $\mu$m in thickness)
   conductivity 20 S/cm, resistance $2.5 \times 10^{-4}$ $\Omega \cdot cm^2$
fuel electrode material:
   Ni/YSZ (60:40) (50 $\mu$m in thickness)
      conductivity 500–1000 S/cm,
      resistance $1-0.5 \times 10^{-5}$ $\Omega \cdot cm^2$ The numerals of resistance above all indicate resistance values per unit area as measured in the thicknesswise direction. As will be apparent from the above data, partly from the reason that the interconnector layer is necessitated to have a thickness enough for in itself reserving a mechanical strength as a structural member, the interconnector layer has a predominantly high electric resistance, and so, it is necessary to minimize the length of this electric flow passage. Furthermore, if the above-described data are applied to an electric flow passage schematically shown in FIG. 4, when a pitch of dimples is chosen to be 3 mm, that is, a lateral path length of electrons is 1.5 mm, a thickness of an interconnector layer 5 made of $LaSrCrO_3$ is 2 mm and thicknesses of a fuel electrode made of Ni/YSZ and an oxygen electrode made of $LaSrCrO_3$ are varied, an overall resistance of the three-layer structure would change as indicated in the following Table-1:

TABLE-1

| | | Thickness of Oxygen Electrode | | | |
|---|---|---|---|---|---|
| | | 50 μm | 100 μm | 150 μm | 200 μm |
| Thickness of Fuel Electrode | 50 μm | 0.25 | 0.14 | 0.10 | 0.085 |
| | 100 μm | 0.25 | 0.14 | 0.10 | 0.081 |
| | 150 μm | 0.25 | 0.14 | 0.10 | 0.080 |
| | 200 μm | 0.25 | 0.13 | 0.10 | 0.079 |

Unit: $\Omega \cdot cm^2$

As will be obvious from Table-1 above, while the thickness on the fuel electrode side could be chosen to be 50 μm at maximum, on the oxygen electrode side an electric resistance largely depends upon the thickness, and so, in order to reduce an electric resistance the thickness must be chosen thick.

Whereas, according to the present invention, since a resistance caused by lateral flows of electrons in an electrode is not present, upon connecting an oxygen electrode of a generating layer with an interconnector layer, it is only necessitated to apply a relatively thin adhesive (normally the same material as the oxygen electrode is used) to such extent that electrical connection can be made.

As described above, in the SOFC according to the present invention, an electric resistance can be reduced, and also amounts of materials of an oxygen electrode and a fuel electrode can be made small. Therefore, the present invention can provide an improved solid oxide electrolyte fuel cell having a power generation efficiency enhanced and having a manufacturing cost reduced.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

Figure 1:
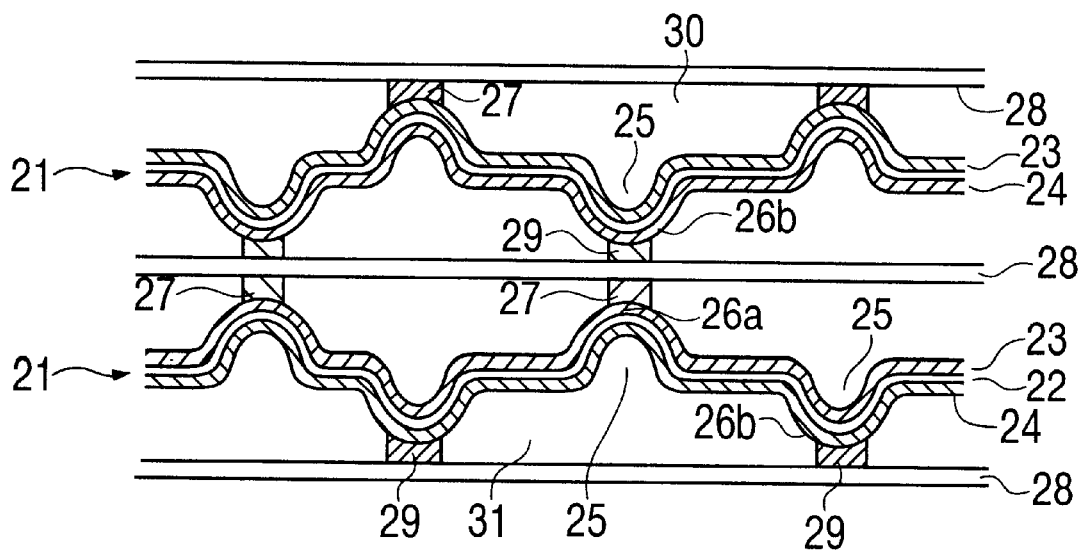
FIG. 1 is a schematic cross-section view of an SOFC according to one preferred embodiment of the present invention.
Figure 2:
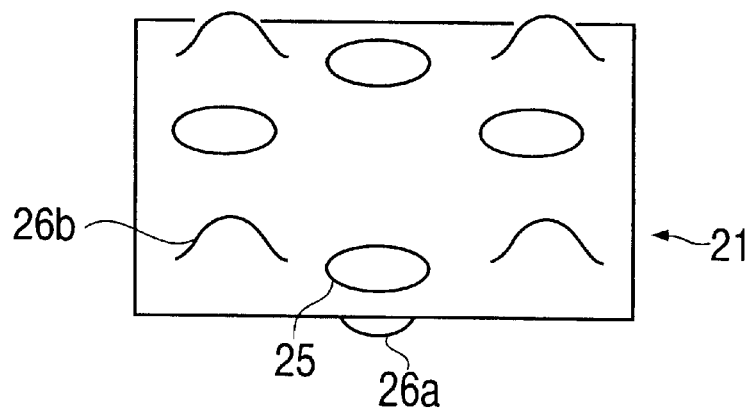
FIG. 2 is a schematic perspective view of a generating layer in the SOFC shown in FIG. 1.
Figure 3:
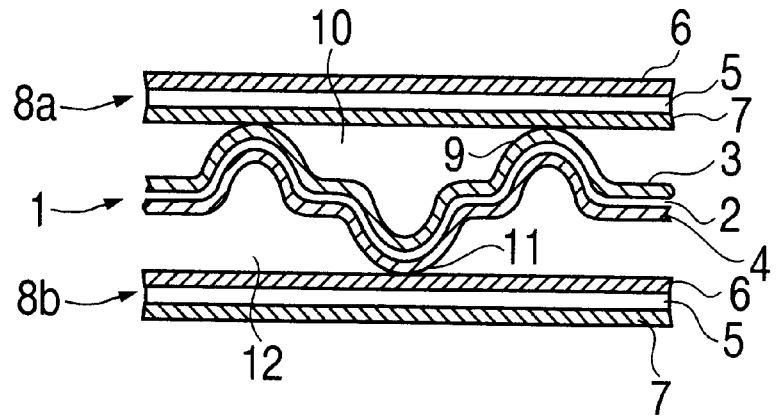
FIG. 3 is a schematic cross-section view of one example of an SOFC in the prior art.
Figure 4:
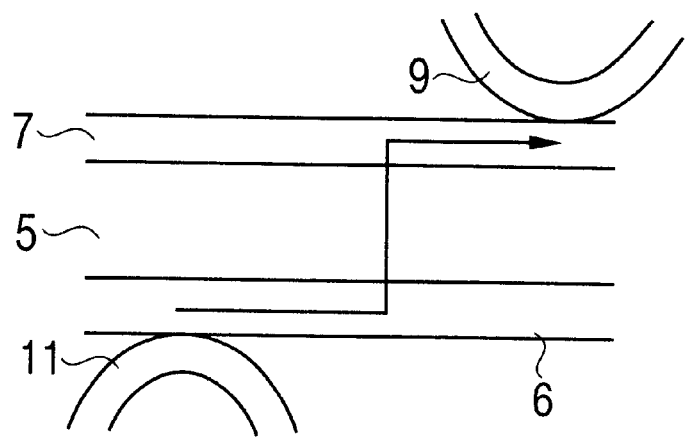
FIG. 4 is a diagrammatic cross-section view showing flows of electrons in the SOFC shown in FIG. 3.

Now, the present invention will be described in greater detail in connection to one preferred embodiment of the invention illustrated in FIGS. 1 and 2.

In these figures, reference numeral 21 designates a generating layer, in which a fuel electrode 23 and an oxygen electrode 24 are respectively formed on the opposite surfaces of a solid oxide layer 22. On the both sides of the generating layer 21 are formed a large number of dimples (recessed portions) 25, and on the opposite side to the recessed portions of the dimples 25 are formed protruded portions 26a and 26b. A protruded portion 26a on the fuel electrode side of one generating layer 21 is bonded with an interconnector layer 28 via a first conductive adhesive 27 made of material common to the fuel electrode 23. On the other hand, a protruded portion 26b on the oxygen electrode side of another generating layer 21 is bonded with the same interconnector layer 28 via a second conductive adhesive 29 made of material common to the oxygen electrode 24 at a position opposed to the protruded portion 26a on the fuel electrode side of the first-mentioned generating layer 21. In addition, reference numeral 30 designates a space region surrounded by the generating layer 21, the conductive adhesives 27 and the interconnector layer 28, that is, a fuel passage for feeding fuel gas to the fuel electrode 23. Likewise, reference numeral 31 designates a space region surrounded by the generating layer 21 (secondly referred to), the conductive adhesives 29 and the interconnector layer 28, that is, an oxygen passage for feeding fuel gas to the oxygen electrode 24.

In the SOFC according to the illustrated embodiment of the present invention, occurrence of lateral flows of electrons in the interconnector layer 28 having a large resistance can be suppressed, owing to the novel construction that generating layers 21 composed of a solid oxide layer 22 having a fuel electrode 23 and an oxygen electrode 24 formed respectively on its opposite surfaces and interconnector layers 28 are disposed alternately, protruded portions 26a on the fuel electrode side of the generating layer 21 are bonded with the interconnector layer 28 via a first conductive adhesive 27 made of material common to the fuel electrode 23, also protruded portions 26b on the oxygen electrode side of another generating layer 21 disposed on the opposite side of the same interconnector layer 28 are bonded with the same interconnector layer 28 via a second conductive adhesive 29 made of material common to the oxygen electrode 24, and moreover, the bonding portion between the first conductive adhesive 27 and the interconnector layer 28 and the bonding portion between the second conductive adhesive 29 and the same interconnector layer 28 are positioned as opposed to each other.

While a principle of the present invention has been described above in connection to one preferred embodiment of the invention, it is a matter of course that many apparently widely different embodiments of the present invention could be made without departing from the spirit of the present invention.

What is claimed is:

1. A solid oxide electrolyte fuel cell comprising: first and second generating layers each consisting of an oxide layer, and a fuel electrode and an oxide electrode disposed on opposite sides of said oxide layer, each of said generating layers having a two-dimensional array of dimples in each side thereof, and each of said generating layers having corresponding protrusions, formed by the dimples, at each side thereof; an interconnector layer; electrically conductive first adhesive interposed between said interconnector layer and the protrusions at the side of said first generating layer where said fuel electrode is disposed, said first adhesive bonding said first generating layer to said interconnector layer; and electrically conductive second adhesive interposed between said interconnector layer and the protrusions at the side of said second generating layer where said oxygen electrode is disposed, said second adhesive bonding said second generating layer to said interconnector layer.

2. A solid oxide electrolyte fuel cell as claimed in claim 1, wherein said first adhesive and the fuel electrode of said first generating layer are of materials having an element in common, and the second adhesive and the oxygen electrode of said second generating layer are of materials having an element in common.

* * * * *